US007974643B2

(12) United States Patent
Catovic et al.

(10) Patent No.: US 7,974,643 B2
(45) Date of Patent: Jul. 5, 2011

(54) REDUCING MOBILE-TERMINATED CALL SET UP BY IDENTIFYING AND MITIGATING OVERLAP BETWEEN PAGING AND SYSTEM INFORMATION BROADCAST

(75) Inventors: Amer Catovic, San Diego, CA (US); Mohit Narang, Escondido, CA (US); Ali Taha, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 782 days.

(21) Appl. No.: 11/934,350

(22) Filed: Nov. 2, 2007

(65) Prior Publication Data

US 2008/0287134 A1 Nov. 20, 2008

Related U.S. Application Data

(60) Provisional application No. 60/865,124, filed on Nov. 9, 2006.

(51) Int. Cl.
*H04W 68/00* (2009.01)
(52) U.S. Cl. ......................................... 455/458; 455/445
(58) Field of Classification Search .................. 455/445, 455/458
See application file for complete search history.

(56) References Cited

U.S. PATENT DOCUMENTS

| 2006/0111127 | A1* | 5/2006 | Jang .............................. 455/458 |
| 2008/0182577 | A1* | 7/2008 | Ng et al. ....................... 455/435.2 |
| 2008/0207228 | A1* | 8/2008 | Catovic et al. ................. 455/458 |

FOREIGN PATENT DOCUMENTS
WO 2007127942 11/2007

OTHER PUBLICATIONS

ETSI Standards, "Universal Mobile Telecommunications System (UMTS); Radio Resource Control (RRC); Protocol Specification (3GPP TS 25.331 version 7 2 0 Release 7); ETSI TS 125 331," Sep. 2006, pp. 41-43 and 247-251 European Telecommunications Standards Institute, Sophia-Antipo, France, XP014035587.
International Search Report, PCT/US07/083592, International Search Authority, European Patent Office, May 7, 2008.
Written Opinion, PCT/US07/083592, International Search Authority, European Patent Office, May 7, 2008.
ETSI TS 125 331 v.7.2.0: "Universal Mobile Telecommmunications System (UMTS): Radio Resource Contro; (RRC); Protocol specification (3GPP TS 25.331 version 7.2.0 Release 7);" Sep. 2006, ETSI Standards, European Telecommunications Standards Institute, pp. 44-50.

* cited by examiner

*Primary Examiner* — Barry W Taylor
(74) *Attorney, Agent, or Firm* — Abdollah Katbab

(57) ABSTRACT

In a Universal Mobile Telecommunications (UMTS) system, a mobile device reads scheduling information for uplink interference (SIB7) from a Master Information Block, broadcasted on the Broadcast Channel (BCCH). The UE wakes up from the sleep during its periodic paging occasions and reads the paging indicator channel (PICH). If the UE needs to read the PCH, then the UE computes the timing of the next broadcast of SIB7 using the scheduling information broadcast in the MIB on BCCH. Knowing the timing of the next SIB7, the UE can determine if there is an overlap. If overlap is detected, the mobile device demodulates both the paging channel carried by the Secondary Common Control Physical Channel (S-CCPCH) and the broadcast channel carried by the Primary CCPCH, avoiding a mobile-terminated (MT) call setup delay by waiting for the next SIB7 broadcast, which depending upon a SIB7 repetition ranges from 360 msec to 2.56 seconds.

16 Claims, 4 Drawing Sheets

REDUCING MOBILE-TERMINATED CALL SET UP BY IDENTIFYING AND MITIGATING OVERLAP BETWEEN PAGING AND SYSTEM INFORMATION BROADCAST

CLAIM OF PRIORITY UNDER 35 U.S.C. §119

The present Application for Patent claims priority to Provisional Application No. 60/865,124 entitled "REDUCING MOBILE-TERMINATED CALL SETUP TIME BY IDENTIFYING AND MITIGATING OVERLAP BETWEEN PAGING AND SYSTEM INFORMATION BROADCAST" filed 9 Nov. 2006, and assigned to the assignee hereof and hereby expressly incorporated by reference herein.

BACKGROUND

1. Field

This application relates in general to UMTS (Universal Mobile Telecommunications System) and in particular to a method and apparatus for monitoring paging and broadcast system information in universal mobile telecommunications system user equipment.

2. Background

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

The radio access network covers a geographical area divided into a plurality of cell areas. Each cell area is served by at least one base station, which may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE) that complies with the 3GPP specifications for the UMTS protocol. The 3GPP 25.331 specification, version 7.5.0 Release 7, referred to herein as the 25.331 specification, addresses the subject of UMTS RRC (Radio Resource Control) protocol requirements between the UMTS Terrestrial Radio Access Network (UTRAN) and the UE. Clause 8.5.7 of the 25.331 specification describes a protocol for open loop power control wherein system information from the network is used to calculate an appropriate transmit power level of a connection request message by the UE. One of the factors received is uplink interference contained in System Information Block 7 (SIB7) broadcast by the network. The UE wakes up at regular intervals to monitor the paging indicator channel in order to be able to respond to an in-bound call. In order to preserve battery service life, the UE sleeps between these waking periods.

SUMMARY

The following presents a simplified summary in order to provide a basic understanding of some aspects of the disclosed versions. This summary is not an extensive overview and is intended to neither identify key or critical elements nor delineate the scope of such versions. Its purpose is to present some concepts of the described versions in a simplified form as a prelude to the more detailed description that is presented later.

It has been realized that the priority given to monitoring the paging channel can collide with the need to monitor broadcasts of system information necessary for initiation of a call setup, causing the need to wait for another broadcast of system information before proceeding. Being able to predict and remedy this situation can improve the user experience.

In one aspect, a method for mobile-terminated call setup in a mobile telecommunications system comprised of a network of a plurality of cells and at least one user equipment device reduces call setup time by avoiding missing a required system information block. In particular, if there is a need to read a paging block on the paging channel, the time of the next broadcast of the system information block carrying the uplink interference value is calculated. When an overlap between a required system information block and a paging block is predicted, both the broadcast channel and the paging channel are simultaneously demodulated. Thereby, a delay in call set up caused by the missed system information broadcasts is avoided. Moreover, unnecessary simultaneous demodulation that occupies additional hardware at the cost of battery service life and/or processing other communications is avoided unless the overlap occurs.

In other aspects, a computer program product contains computer recorded medium having sets of code to cause a computer, at least one processor contains modules, and an apparatus contains means, each for performing the method for mobile-terminated call setup.

In another aspect, an apparatus has a receiver for receiving broadcast system information on a broadcast channel and a paging indicator on a paging indicator channel. A processor calculates any overlap of an assigned paging block on a paging channel and a system information block required for call setup. An interface responds to an overlap prediction by simultaneously demodulating the broadcast channel and the paging channel to reduce call setup time.

To the accomplishment of the foregoing and related ends, one or more versions comprise the features hereinafter fully described and particularly pointed out in the claims. The following description and the annexed drawings set forth in detail certain illustrative aspects and are indicative of but a few of the various ways in which the principles of the versions may be employed. Other advantages and novel features will become apparent from the following detailed description when considered in conjunction with the drawings and the disclosed versions are intended to include all such aspects and their equivalents.

DETAILED DESCRIPTION

In a Universal Mobile Telecommunications (UMTS) system, UE wakes up from the sleep during its periodic paging occasions and reads the paging indicator channel (PICH). PICH consists of many paging indicators belonging to different UEs that wake up at the same time. If the UE's paging indicator is detected as set by the network, the UE needs to read the next paging block on the paging channel (PCH) in order to determine of there is a page from the network destined to the UE. If the paging indicator is detected as not set, the UE does not need to read the PCH. If the UE reads the PCH and determines that there is a page destined to it, the UE will respond to the page by initiating a mobile-terminated call setup procedure. As a pre-requisite for initiation of the call set-up procedure, the UE needs to have a valid value of the uplink interference, which is broadcast by the network in the system information block 7 (SIB7) on the broadcast common channel (BCCH). The UE computes the timing of the next broadcast of SIB7 using the scheduling information broadcast in the master information block (MIB) on BCCH. Knowing the timing of the next SIB7, the UE can determine if there is an overlap between the paging block on the PCH and the SIB7 broadcast on the BCCH. If overlap is detected, the mobile device will then take appropriate action to demodulate both the paging channel carried by the Secondary Common Control Physical Channel (S-CCPCH) and the broadcast common channel carried by the Primary Common Control Physical Channel (P-CCPCH). The mobile device will therefore get the paging block as well as read the SIB7 even in the overlap scenario, avoiding a mobile-terminated (MT) call setup delay caused by waiting for the next SIB7 broadcast, which, depending upon a SIB7 repetition factor, occurs every 360 msec to 2.56 seconds.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to concisely describing these versions.

The apparatus and methods are especially well suited for use in wireless environments, but may be suited in any type of network environment, including but not limited to, communication networks, public networks, such as the Internet, private networks, such as virtual private networks (VPN), local area networks, wide area networks, long haul networks, or any other type of data communication network.

Figure 1:
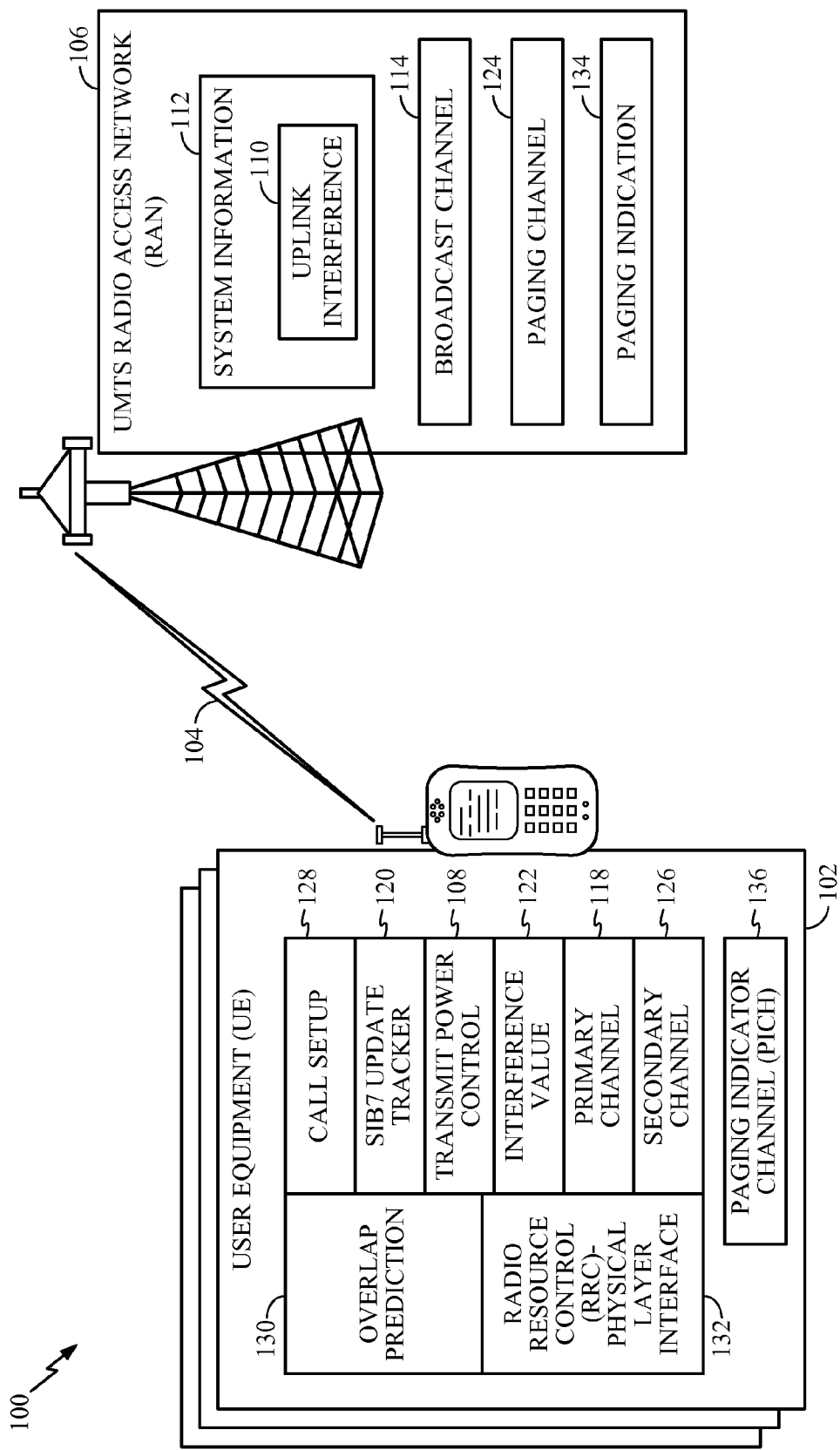
FIG. 1 is a diagram of a Universal Mobile Telecommunications (UMTS) system of network radio access network and user equipment (UE).

In FIG. 1, a mobile cellular system 100 includes a mobile device, depicted as user equipment (UE) 102, that communicates via a wireless channel 104 with a network base station receiver and a radio network controller (RNC), depicted together as a Universal Mobile Telecommunications System (UMTS) Radio Access Technology (RAN) 106. As part of mobile-terminated call setup procedure, in particular Radio resource control (RRC) protocol under Clause 8.5.7 of the 25.331 specification, the UE 102 uses the Open Loop Power Control module 108 to set a transmit power to a value appropriate so that reception of the initial connection request message occurs without undue interference to other devices. One factor in determining the proper transmit power is an amount of uplink interference that the UMTS RAN 106 senses and stores in an uplink interference information element 110 as part of system information data 112. The UMTS RAN 106 disseminates this system information 112 by a broadcast channel component 114. Information specific to a subset of UEs 102 regarding incoming calls is sent over a paging channel component 116.

The UE 102 employs the P-CCPCH demodulation component 118 to demodulate the P-CCPCH and decode the BCCH data, which includes the SIBs and the MIBs. There are many SIB types, containing various system parameters, such as various timers, thresholds, etc. One of these SIBs is SIB7 containing current uplink interference value that is decoded and stored by the UE 102 in an uplink interference information element (IE) 122. The MIBs carry the scheduling information of all SIBs as well as their validity timer values. The UE 102 utilizes an SIB7 update tracker 120 to keep track of the validity of the uplink interference IE as well as the timing of the next occurrence of the SIB7.

During the UE's paging occasion, whose repetition interval is fixed and broadcasted in system information, the UE 102 wakes up from the sleep mode and reads its paging indicator on the PICH. If the UEs paging indicator is detected as set by the network, the UE will then read the paging block on the S-CCPCH. For example, the page can pertain to an incoming call that a call setup component 128 of the UE 102 needs to handle. A problem exists in that the timing of the paging block broadcast can overlap with the timing of the SIB7 broadcast. In such scenario, the priority given to the demodulation of S-CCPCH takes away the resources from the demodulation of the P-CCPCH and causes the SIB7 broadcast to be missed. If the stored value of the uplink interference IE is determined as invalid by the SIB7 update tracker 120, the stored uplink interference IE cannot be used in the call setup and therefore the call setup must be delayed until the next occurrence of the SIB7 broadcast, An overlap prediction component 130 can anticipate these overlap scenarios and utilize a radio resource control (RRC)—Physical L1 (PHY) layer interface 132 to configure simultaneous demodulation of both P-CCPCH and S-CCPCH by the P-CCPCH demodulation component and the S-CCPCH component 118, 126 so that the overlap does not cause a call setup delay.

When the network via the UMTS RAN 106 want to page a UE 102 (e.g., to connect an incoming voice call), a paging indicator (PI) corresponding to the UE 102 is set on a paging indicator channel (PICH) 134, received by a PICH demodulation component 136. The paging mechanism uses two channels, namely the PICH (Paging Indicator Channel) and the PCH (Paging Channel). Paging messages are carried in the PCH, and the PICH carries only indications, if paging messages relating to mobile terminals (UEs) in a given paging group are to be expected. The paging channel is transmitted over a paging area (PA) which may comprise one or more cells. The number of mobile terminals within the paging area can be large, whereby the traffic volume of the paging channel can also be large. This means that if a mobile terminal were to receive paging messages only with the help of the PCH, the mobile terminal would have to listen to paging messages of PCH, which would consume an excessive amount of time for the terminal. This would cause excessive power consumption especially during sleep mode, in which the power consumption of mobile terminals should be as low as possible. The paging indicators carried in PICH indicate to each paging group of mobile terminals, if a paging message is to be expected on the PCH to some terminal of the paging group. Receiving of a paging indicator requires only receiving of a single burst and decoding the data bits of the burst to obtain the paging indicator values. The paging indicators are sent at predetermined intervals, so that terminals can stay in sleep mode between the paging indicator bursts. If a paging indicator indicates that a paging message is to be expected for the paging group of a particular mobile terminal, that mobile terminal begins to listen to PCH for a certain period to find out, if any paging messages are intended to that mobile terminal. Terminals in a paging area are divided into paging groups (e.g., 60), which allow the number of mobile terminals to stay rather low. The low number of terminals in a paging group results in a low number of paging messages intended for terminals in the group, whereby the terminals need to listen to PCH only for short periods of time. This results in low power consumption in the sleep mode. In particular, paging indicators are grouped into frames.

Figure 2:
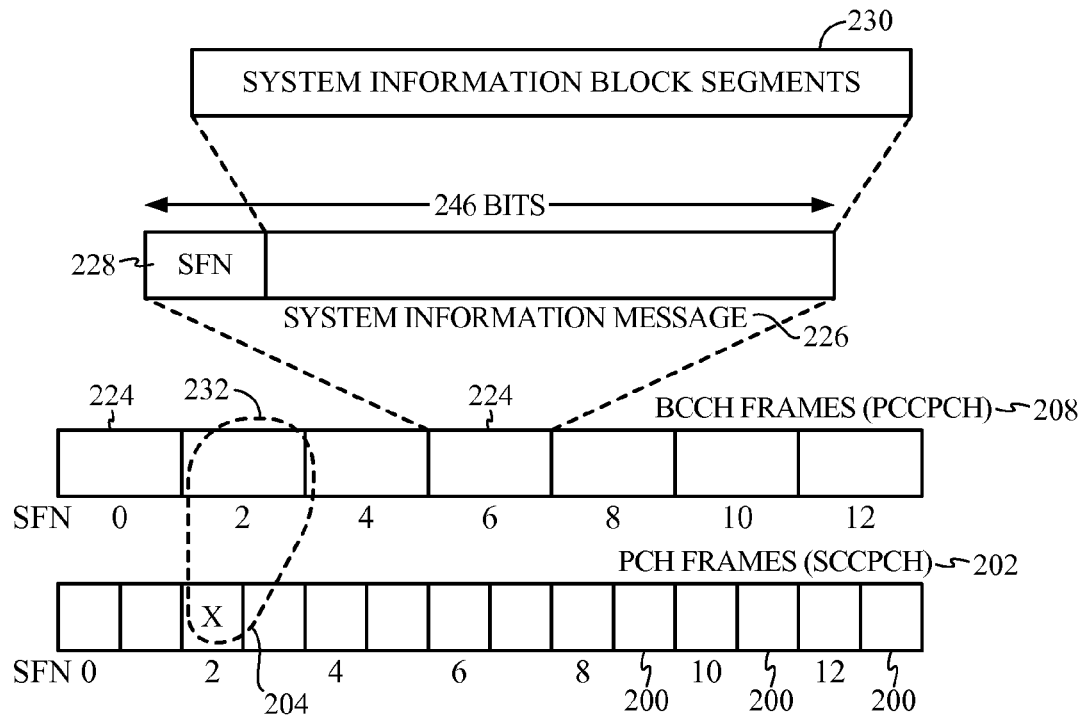
FIG. 2 is a diagram of Primary and Secondary Common Control Physical Channels with a collision between a Paging Block and a System Information Block (SIB).
Figure 3:
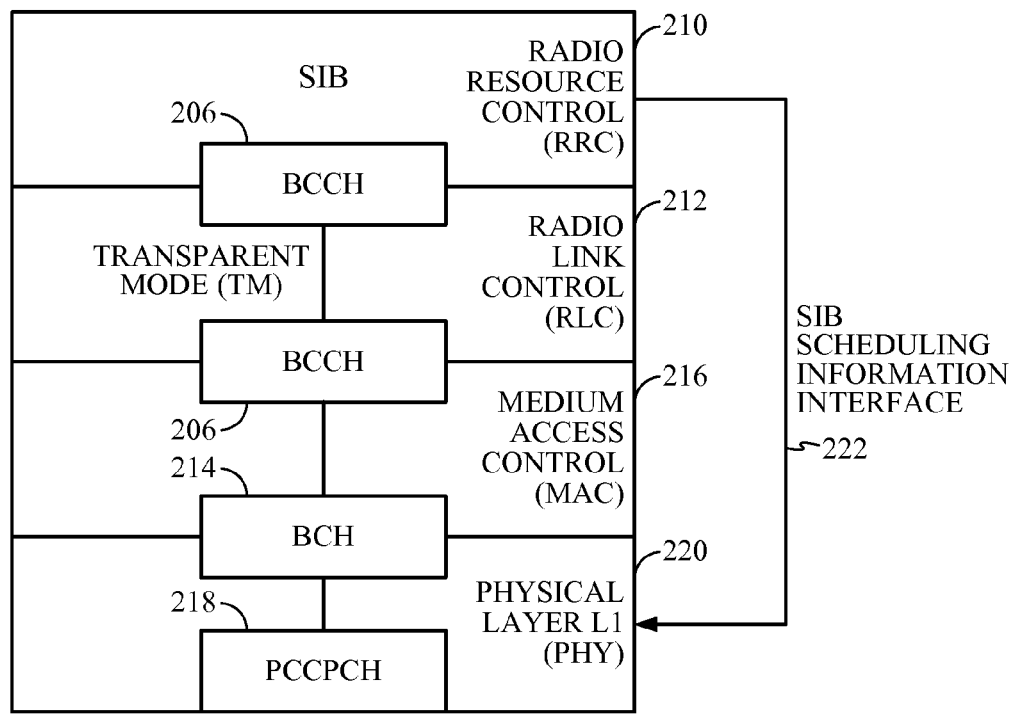
FIG. 3 is a diagram of a Radio Resource Control (RRC)-Physical (PHY) layer interface of the UE of FIG. 1.

With reference to FIGS. 2-3, the assigned frames are termed paging occasions that occur with relation to a System Frame Number (SFN):

$$SFN=\{(IMSI\ div\ K)\ mod\ DRX\ cycle\ length\}+n*DRX\ cycle\ length,$$

Where K is the number of S-CCPCH channels in a cell (usually 1), DRX cycle length is a configurable parameter set by the network, and IMSI is the International Mobile Subscriber Identity, which is a fixed number assigned by the network to each subscriber. If the UE 102 (FIG. 1) determines that the corresponding PI on the PICH is set, the UE 102 then stays awake to read a next frame 200 on the paging channel (PCH), which is mapped onto a Secondary Common Control Physical Channel (S-CCPCH) 202 in order to determine if there is an incoming page destined for the UE 102, depicted at 204.

With particular reference to FIG. 3, the UE 102 also listens to a broadcast logical channel (BCCH) 206 in order to collect system information blocks (SIB) 208. The demodulation of BCCH logical channel 206 at a radio resource control (RRC) layer 210, related by transparent mode ("TM") to a radio link control (RLC) layer 212, has a broadcast channel (BCH) transport channel 214 on the medium access control (MAC) layer 216 and is mapped onto a Primary Common Control Physical Channel (P-CCPCH) 218 of a physical L1 (PHY) layer 220. An SIB scheduling information interface 222 communicates between the RRC layer 208 and the PHY L1 layer 220 to selectively monitor the P-CCPCH 218 as well.

With particular reference to FIG. 2, each frame 224 contains a system information message 226 containing a system frame number 228 and system information block segments 230. In the example shown, an SIB7 segment is scheduled for a particular frame 232 on the PCCPCH 208 that collides with the incoming page frame 204 assigned to the UE 102. The SIB7 validity interval, which in the 25.331 specification is referred to as expiration timer, is the time during which the UE can initiate a call setup without reading a new SIB7, using the last stored value of SIB7 in interference value data structure 122. If the expiration timer is less than or equal to the SIB repetition rate, the UE 102 has to read every SIB7 broadcasted by the network. Thus, this collision delays call setup until the next opportunity to reach the SIB7. In some instances, the expiration timer will be greater than the repetition rate, which mitigates the impact. However, generally-known networks tend to use the expiration timer as equal to the SIB7 repetition rate.

Figure 4:
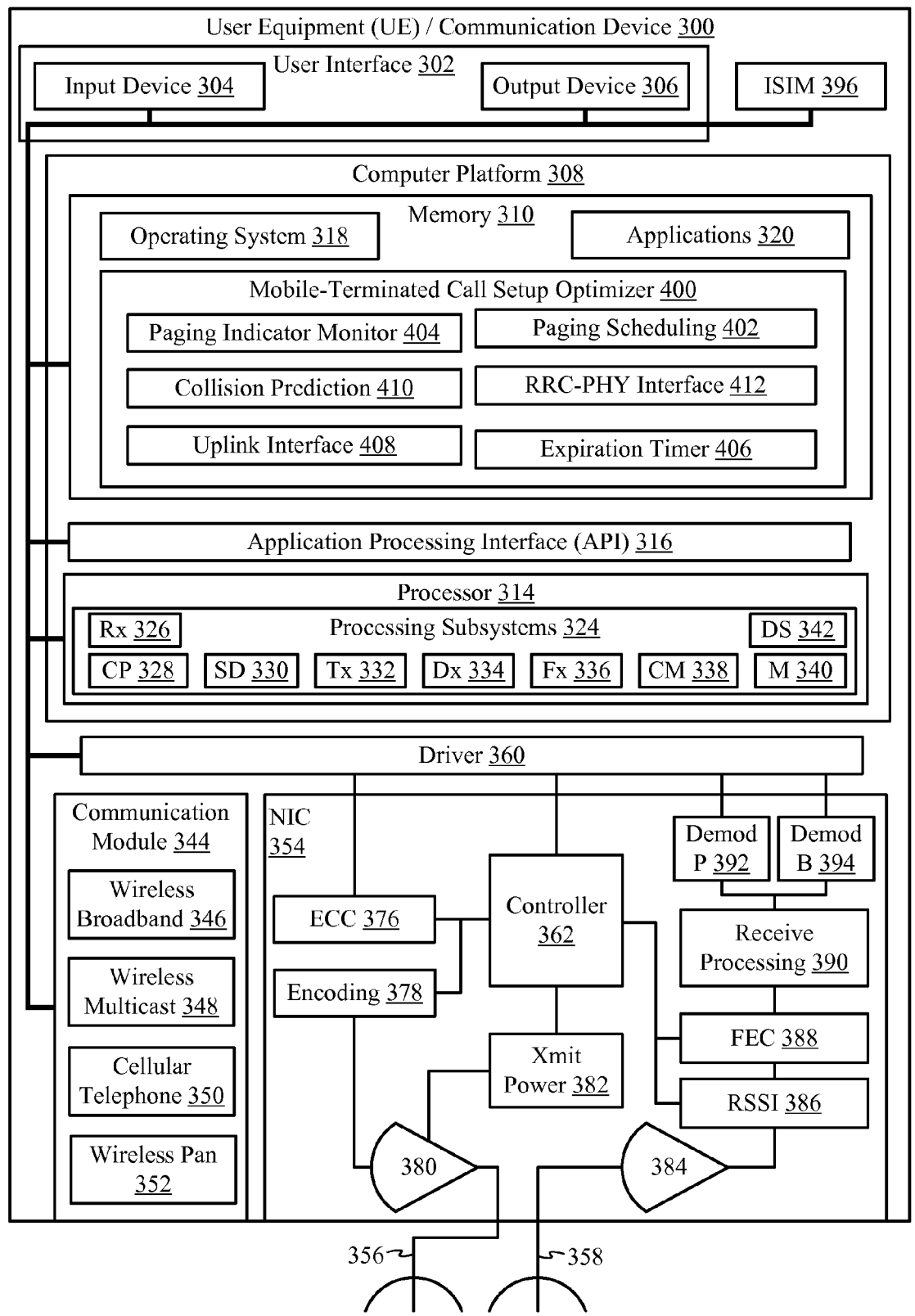
FIG. 4 is a schematic diagram of a UE having a computing platform for demodulating the Primary and Secondary Common Control Physical Channels

With reference to FIG. 4, an exemplary version of a communication system 300 is depicted according to some aspects as any type of computerized device. For example, the communication device 300 may comprise a cellular telephone, which is depicted as also including wireless data communication features. Alternatively, the communication device 300 may comprises a fixed communication device, such as a Proxy Call/Session Control Function (P-CSCF) server, a network device, a server, a computer workstation, etc. It should be understood that communication device 300 is not limited to such a described or illustrated devices, but may further include a Personal Digital Assistant (PDA), a two-way text pager, a portable computer having a wired or wireless communication portal, and any type of computer platform having a wired and/or wireless communications portal. Further, the communication device 300 can be a remote-slave or other similar device, such as remote sensors, remote servers, diagnostic tools, data relays, and the like, which does not have an end-user thereof, but which simply communicates data across a wireless or wired network. In alternate aspects, the communication device 300 may be a wired communication device, such as a landline telephone, personal computer, set-top box or the like. Additionally, it should be noted that any combination of any number of communication devices 300 of a single type or a plurality of the afore-mentioned types may be utilized in a cellular communication system (not shown). Therefore, the present apparatus and methods can accordingly be performed on any form of wired or wireless device or computer module, including a wired or wireless communication portal, including without limitation, wireless modems, Personal Computer Memory Card International Association (PCMCIA) cards, access terminals, personal computers, telephones, or any combination or sub-combination thereof.

Additionally, the communication device 300 may include a user interface 302 for purposes such as viewing and interacting with advertisements. This user interface 302 includes an input device 304 operable to generate or receive a user input into the communication device 300, and an output device 306 operable to generate and/or present information for consumption by the user of the communication device 300. For example, input device 302 may include at least one device such as a keypad and/or keyboard, a mouse, a touch-screen display, a microphone in association with a voice recognition module, etc. Further, for example, output device 306 may include a display, an audio speaker, a haptic feedback mechanism, etc. Output device 306 may generate a graphical user interface, a sound, a feeling such as a vibration or a Braille symbol producing surface, etc.

Further, communication device 300 may include a computer platform 308 operable to execute applications to provide functionality to the device 300, and which may further interact with input device 304 and output device 306. Computer platform 308 may include a memory 310, which may comprise volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Further, memory may include active memory and storage memory, including an electronic file system and any secondary and/or tertiary storage device, such as magnetic media, optical media, tape, soft and/or hard disk, and removable memory components.

Further, computer platform 308 may also include a processor 314, which may be an application-specific integrated circuit (ASIC), or other chipset, processor, logic circuit, or other data processing device. Certain of these capabilities of the communication device 300 can be facilitated by code loaded from local storage over a data bus 112, retained in RAM, and executed by the processor 314. In some aspects, such as when communication device 300 comprises a cellular telephone, processor or other logic can be integrated via a application programming interface (API) 316 interfaces with any resident software components, depicted as an operating system 318 and applications 320 that may be active in memory 310 for other functions (e.g., communication call control, alarm clock, text messaging, etc.).

Additionally, processor 314 may include various processing subsystems 324 embodied in hardware, firmware, software, and combinations thereof, that enable the functionality of communication device 300 and the operability of the communication device 300 on communications system 100 (FIG. 1). For example, processing subsystems 324 allow for initiating and maintaining communications, and exchanging data, with other networked devices as well as within and/or among components of communication device 300. In one aspect, such as in a cellular telephone, processor 314 may include one or a combination of processing subsystems 324, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM (universal subscriber identity module/subscriber identity module), voice services, graphics, USB (universal serial bus), multimedia such as MPEG (Moving Picture Experts Group) protocol multimedia, GPRS (General Packet Radio Service), short message service (SMS), short voice service (SVS™), web browser, etc. For the disclosed aspects, processing subsystems 324 of processor 314 may include any subsystem components that interact with applications executing on computer platform 308.

The illustrative depiction of the processing subsystems 324 wherein the communication device 300 is a cellular telephone, processing subsystems 324 include one or more of a receive ("Rx") component 326 for receiving communications sent to the processor of the wireless device, a call processing ("CP") component 328 and/or system determination ("SD") component 330 for handling the initiation, authentication, handoffs, data exchanges, messaging protocols, internal processing and decision-making, etc. associated with processing a message, and a transmit ("Tx") component 332 for sending communications from the processor 314 of the communication device 300, such as to handset components, wireless network, wireless network components, and other devices connected to the wireless network. In this version, CP component 328 may handle the majority of the call processing tasks, while SD component 330 may handle tasks relating to selecting an appropriate system, from a plurality of systems, with which to communicate, as well as higher-level decision-making tasks referenced by CP component 328. In addition, processing subsystems 324 may further include one or more of a diagnostic ("Dx") component 334 for evaluating a subsystem, a fax ("Fx") component 336 for handling facsimile communications, a call manager ("CM") 338 component for characterizing and logging call types, a messaging component ("M") 340 for text sending and receiving, and a data services ("DS") component 342 for processing all data-related communications, such as establishing and maintaining data calls.

A communications module 344 enables communications among the various components of communication system 100. Communications module 344 may be embodied in hardware, firmware, software and/or combinations thereof, and may further include all protocols for use in intra-device and inter-device communications. In one aspect, the communication module 344 includes a wireless broadband access technology portion 346, a wireless multicast technology portion 348, a cellular telephone radio technology portion 350, and a wireless personal access network portion 352. Examples of two-way wireless broadband access technology portion 346 can include one or more of a wireless code division multiple access (W-CDMA) component, an Evolution-Data Optimized (EV-DO) component, an IEEE 802.11 compliant (i.e., often generically referred to by the trademark WiFi) component. An example of a wireless personal access network technology portion 346 includes a Bluetooth component. Examples of a wireless multicast technology portion 348 include a Forward Link Only (FLO) component and/or a Digital Video Broadcast—Handheld (DVB-H) component.

Portions of wireless communication capabilities can be incorporated into a Network Interface Card (NIC) 354. NIC 354 can provide functionality of a receiver and transmitter configured to receive and transmit wireless communications over a transmit antenna 356 and a receive antenna 358. The NIC 354 is interfaced to the computer platform 308 via a driver 360. A controller 362 of the NIC 354 can receive commands from driver 360. In some versions, commands for controller 362 may be generated within components of operating system 318 and application 320. In the illustrative version, the NIC 354 can monitor certain channels, such as for paging indicator channel (PICH) and/or to perform data communications such as for dual mode communication devices. The NIC 354 also illustrates an uplink capability with adjustable transmit power such as for responding to an uplink interference value.

To send packets from the communication device 300, the packets can be encoded using an Error Control Coding (ECC) component 376 providing error control coding of any suitable type. For example, the encoding may use a multi-bit error correcting code. In the version illustrated, ECC component 376 can add a number of error control bits to each packet to be transmitted. The number of error control bits added to a packet may be configurable in response to commands from controller 362. Altering the number of bits per packet used for error control coding is a possible adaptation that may be made in NIC 354 for poor channel conditions. For example, more error control bits can be added in a noisy channel in which frequent errors occur. However, increasing the number of bits used for error correction reduces the percentage of bits used for data transmission.

An encoding component 378 may implement any suitable encoding according to a data transmission protocol used for wireless communication. Encoding implemented within encoding component 378 may use a modulation scheme that is configurable based on input from controller 362. The modulation scheme used in encoding component 378 may also be used to adapt to channel conditions. For example, encoding component 378 may support a range of encoding schemes with a variable number of bits per symbol. To adapt to noisy channels, encoding component 378 may be controlled to use an encoding scheme with a high number of bits per symbol. The encoded data are then transmitted by a transmitter 380 at a transmit power level controlled by a transmit "Xmit" power controller 382. Transmission may be made via one or more transmit antennae 356. The transmit power level may also be controlled by controller 362 and may serve to channel conditions, such as uplink interference for which a higher transmit power may be specified.

Corresponding processing may be performed on received packets. Packets received by the communication device 300 at one or more receive antennae 358 may be processed through a receiver 384 and then supplied to a received signal strength indicator (RSSI) component 386. RSSI may be obtained from a field in a received packet or it may be directly measured from the received wireless signal and then output in any suitable format. RSSI component 386 may output signal strength or a signal to noise ratio (SNR) for any desired packets. In the version illustrated, RSSI component 386 outputs a signal strength indication based on the received signal strength. However, the signal strength indication may be obtained in any suitable way. For example, it can be a field in a packet (e.g., an ACK packet) that contains an SNR value from a corresponding packet measured at the receiver side (e.g., a DATA packet).

The FEC component 388 is coupled to a received data processing component 390 which further processes the received packets. Received processing component 390 may perform any number of received processing operations. For example, received processing component 390 may include a buffer in which a received packet is stored until it is transferred for further processing within operating system 318. Separate component capabilities can be provided for simultaneous demodulating channels received simultaneously, depicted as a primary demodulator 392, such as for P-CCPCH, and as a secondary demodulator 394, such as for the S-CCPCH.

In memory, an IP Multimedia System (IMS) subscriber identity module (ISIM) 396 is depicted as part of the communication device, provisioning the communication device 300 for session initiation protocol (SIP) and can include the functionality of a subscriber identity module (SIM), a universal subscriber identity module (USIM), and/or an IMS subscriber identity module (ISIM). In the exemplary version, the ISIM 396 is a UICC (UMTS Integrated Circuit Card), which is the chip card, used in mobile terminals in GSM and UMTS networks. The UICC ensures the integrity and security of all kinds of personal data. In a GSM network, the UICC contains a SIM application and in a UMTS network it is the USIM application. A UICC may contain several applications (not shown), making it possible for the same smartcard to give access to both GSM and UMTS networks, and also provide storage of a phone book and other applications. In support of UMTS release 5, the IP multimedia Services Identity Module (ISIM) is required for services in the IMS. IP Multimedia Services Identity Module (ISIM) is an application running on a UICC smart card in a 3G mobile telephone in the IP Multimedia Subsystem (IMS). It contains parameters for identifying and authenticating the user to the IMS. The ISIM application can co-exist with SIM and USIM on the same UICC making it possible to use the same smartcard in both GSM networks and earlier releases of UMTS.

In memory 310, a mobile-terminated call setup optimizer 400 uses the identifying information of ISIM 396 in a paging scheduling component 402 to determine the assigned paging frames for the communication device 300. A paging monitor component 404 receives a PI that the communication device 300 should monitor the paging channel. An expiration timer data structure 406 determines when a stored value for uplink interference 408 needs updating prior to call setup. A collision prediction component 410 determines that a collision is going to occur because the expiration timer data structure 406 will expire but the paging monitor component 404 has detected a need to monitor the paging channel. Advantageously, an RRC-PHY interface component 412 enables simultaneous demodulation by primary and secondary demodulators 392, 394 in order to not miss an update for the uplink interference 408.

Figure 5:
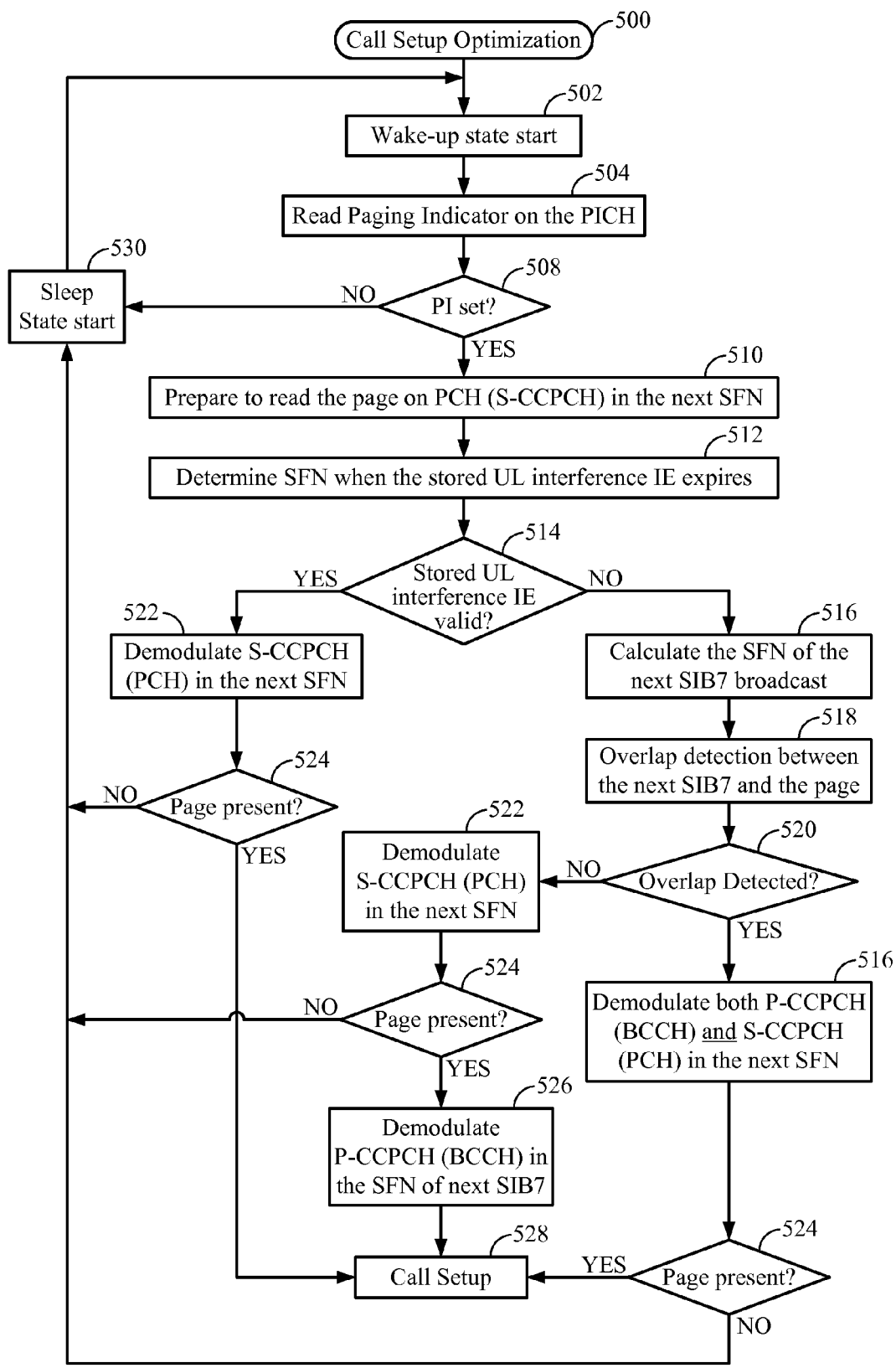
FIG. 5 is a flow diagram of a methodology for mobile-terminated call setup optimization performed by the UE of FIG. 1.

In FIG. 5, a methodology 500 for optimizing mobile-terminated call setup begins in block 502 by entering the wake-up state from the sleep state. This procedure is implemented in the UE in a standard complying manner and is not altered by this invention. In block 504, the paging indicator corresponding to the UE is read. The value of the paging indicator is verified in block 508 and if the paging indicator is determined as set by the network, the preparation for demodulating S-CCPCH and decoding the paging channel in the next System Frame Number (SFN) are performed in block 510. In block 512 the SFN of expiration timer of SIB7 is calculated. In block 514 the validity of the stored UL interference IE is determined by comparing the SFN of expiration timer of SIB7 with the current SFN. If the current SFN is smaller than the SFN of the expiration timer of SIB7 than the UL interference IE is considered valid, and vice-versa. If the UL interference value is determined to be valid, then there is no need to read new SIB7 on the broadcast channel. In this case, the demodulation of the S-CCPCH is performed by block 522 in order to read the paging block on PCH and determine if there is a page destined to the UE in block 524. If the page is present, the UE will initiate the call setup procedure 528. If the page is not present, the UE is cleared to start a new sleep cycle 530. If the UL interference value is determined to be not valid in block 514, the UE will compute the SFN of the next SIB7 broadcast in block 516, using scheduling information found in MIB. The overlap detection mechanism in block 518 will determine if the next SIB7 broadcast overlaps with the next SFN in which the UE will be demodulating S-CCPCH. If the overlap is detected 520, the UE will engage necessary resources, including hardware and software, in order to demodulate both P-CCPCH and S-CCPCH during the overlapping frames, so that both the paging block and the SIB7 are acquired. Then, if the page destined to the UE is detected in block 524 the UE will initiate call setup procedure in block 528. If the page is not present, the UE is cleared to start a new sleep cycle 530. If the overlap between the paging block and the SIB7 broadcast is not detected in block 520, the UE proceed with the demodulation of only S-CCPCH in the next SFN in order to read the paging block. If the page destined to the UE is detected in 524, the UE will wait until the SFN of the broadcast of the next SIB7. When the SFN in which the next SIB7 broadcast is scheduled arrives the UE will demodulate P-CCPCH and acquire SIB7 in block 526. The UE will then initiate call setup procedure in block 528. If the page is not present, the UE is cleared to start a new sleep cycle 530.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for mobile-terminated call setup in a mobile telecommunications system, the system comprising a network of a plurality of cells and at least one user equipment device, and said system defining a protocol stack including a lower physical layer L1, the method comprising, in the user equipment:
   receiving a paging indicator on a paging indicator channel;
   calculating an overlap between an assigned paging block on a paging channel and a required system information block on the broadcast channel; and
   simultaneously demodulating the broadcast channel and the paging channel in response to predicting the overlap to reduce call setup time.

2. The method of claim 1, further comprising simultaneously demodulating the broadcast channel to receive an uplink interference system information block and the paging channel to determine whether the network is paging the equipment device.

3. The method of claim 1, further comprising interfacing a radio resource control layer to a lower physical layer L1 to initiate demodulation on both the broadcast channel and the paging channel.

4. At least one processor configured to be able to initiate mobile-terminated call setup in a mobile telecommunications system, the system comprising a network of a plurality of cells and at least one user equipment device, and said system defining a protocol stack including a lower physical layer L1, the at least one processor comprising:
   a first module for receiving a paging indicator on a paging indicator channel;
   a second module for calculating an overlap between an assigned paging block on a paging channel and a required system information block on the broadcast channel; and
   a third module for simultaneously demodulating the broadcast channel and the paging channel in response to predicting the overlap to reduce call setup time.

5. The at least one processor of claim 4, further comprising the third module for simultaneously demodulating the broadcast channel to receive an uplink interference system information block and the paging channel to determine whether the network is paging the at least one equipment device.

6. The at least one processor of claim 4, further comprising an additional module for interfacing a radio resource control layer to a lower physical layer L1 to initiate demodulation on both the broadcast channel and the paging channel.

7. A computer program product for mobile-terminated call setup in a mobile telecommunications system, the system comprising a network of a plurality of cells and at least one user equipment device, and said system defining a protocol stack including a lower physical layer L1, the computer program product comprising:
   a computer-readable medium comprising:
      a first set of codes for causing a computer to receive paging indicator on a paging channel;
      a second set of codes for causing the computer to calculate an overlap between an assigned paging block on a paging channel and a required system information block on the broadcast channel; and
      a third set of codes for causing the computer to simultaneously demodulate the broadcast channel and the paging channel in response to predicting the overlap to reduce call setup time.

8. The computer program product of claim 7, further comprising the third set of codes for causing the computer to simultaneously demodulate the broadcast channel to receive an uplink interference system information block and the paging channel to determine whether the network is paging the at least one equipment device.

9. The computer program product of claim 7, further comprising an additional set of codes for causing the computer to interface a radio resource control layer to a lower physical layer L1 to initiate demodulation on both the broadcast channel and the paging channel.

10. An apparatus for mobile-terminated call setup in a mobile telecommunications system, the system comprising a network of a plurality of cells and at least one user equipment device, and said system defining a protocol stack including a lower physical layer L1, the apparatus comprising, in the user equipment:
   means for receiving a paging indicator on a paging indicator channel;

means for calculating an overlap between an assigned paging block on a paging channel and a required system information block; and means for simultaneously demodulating the broadcast channel and the paging channel in response to predicting the overlap b to reduce call setup time.

11. The apparatus of claim 10, further comprising means for simultaneously demodulating the broadcast channel to receive an uplink interference system information block and the paging channel to determine whether the network is paging the at least one equipment device.

12. The apparatus of claim 10, further comprising means for interfacing a radio resource control layer to a lower physical layer L1 to initiate demodulation on both the broadcast channel and the paging channel.

13. An apparatus for mobile-terminated call setup in a mobile telecommunications system, the system comprising a network of a plurality of cells and at least one user equipment device, the apparatus comprising:

a receiver for receiving broadcast system information on a broadcast channel and a paging indicator on a paging indicator channel;

a processor for calculating any overlap of an assigned paging block on the paging channel and a system information block required for call setup; and an interface responsive to the processor for simultaneously demodulating the broadcast channel and the paging channel in response to the processor predicting the overlap to reduce call setup time.

14. The apparatus of claim 13, further comprising a first demodulator and a second demodulator for simultaneously demodulating respectively the broadcast channel to receive an uplink interference system information block and the paging channel.

15. The apparatus of claim 13, wherein the interface interfaces a radio resource control layer to the lower physical layer receiver to initiate demodulation of both the broadcast channel and the paging channel.

16. The apparatus of claim 13, further comprising an expiration timer used by the processor for determining when a currently stored value provided in a system information block will expire to determine the required system information block.

* * * * *